United States Patent [19]

Kulig et al.

[11] Patent Number: 4,566,894
[45] Date of Patent: Jan. 28, 1986

[54] DEFLECTOR ADJUSTMENT FOR A GLASSWARE FORMING MACHINE

[75] Inventors: Constantine W. Kulig, Windsor; Charles M. Kingsbury; Bruce R. Beckwith, both of Unionville, all of Conn.

[73] Assignee: Emhart Industries, Inc., Farmington, Conn.

[21] Appl. No.: 736,514

[22] Filed: May 20, 1985

Related U.S. Application Data

[63] Continuation of Ser. No. 472,391, Mar. 4, 1983, abandoned.

[51] Int. Cl.⁴ .............................................. C03B 7/14
[52] U.S. Cl. ........................................ 65/304; 65/225
[58] Field of Search ................. 65/207, 221, 225, 240, 65/304; 193/15, 23

[56] References Cited

U.S. PATENT DOCUMENTS

| | | | |
|---|---|---|---|
| 1,619,432 | 3/1927 | Mulholland | 65/207 |
| 1,766,979 | 6/1930 | Canfield | 65/225 |
| 2,340,729 | 2/1944 | Barker, Jr. | 65/225 |
| 3,341,315 | 9/1967 | Patschorke | 65/304 |
| 4,339,264 | 7/1982 | Dahms | 65/240 |

Primary Examiner—William F. Smith
Assistant Examiner—Michael K. Boyer
Attorney, Agent, or Firm—Arthur B. Moore

[57] ABSTRACT

A four axis adjustment mechanism is disclosed for adjusting the orientation of the deflector of the delivery system of a rotating table type of glassware forming machine. The orientation of the deflector is adjustable as it oscillates along a predetermined arcuate path relative to its deflector axis in order to properly position the deflector over a corresponding continuously moving blank mold. These adjustments are termed radial, radial tilt, peripheral and peripheral tilt.

2 Claims, 12 Drawing Figures

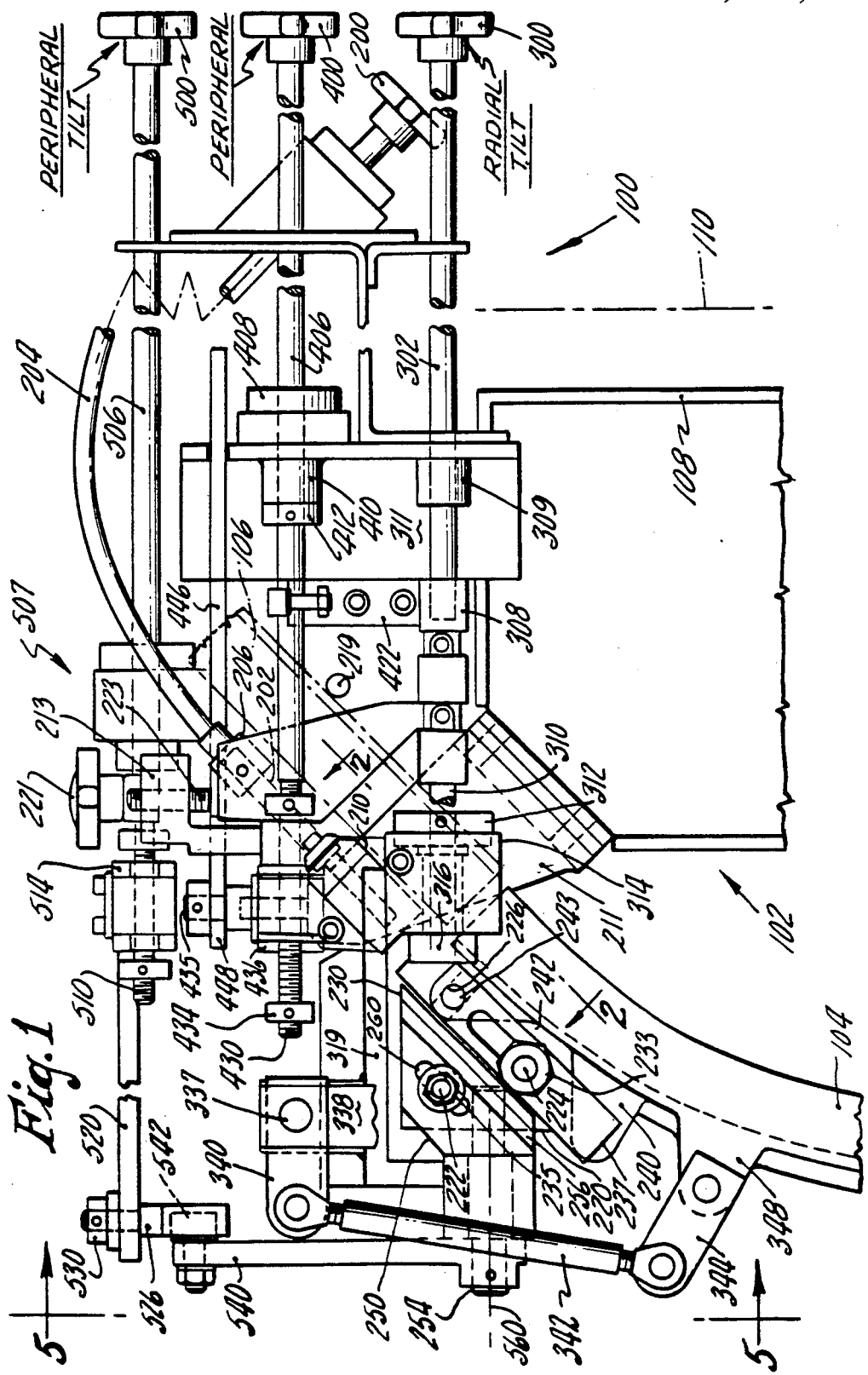

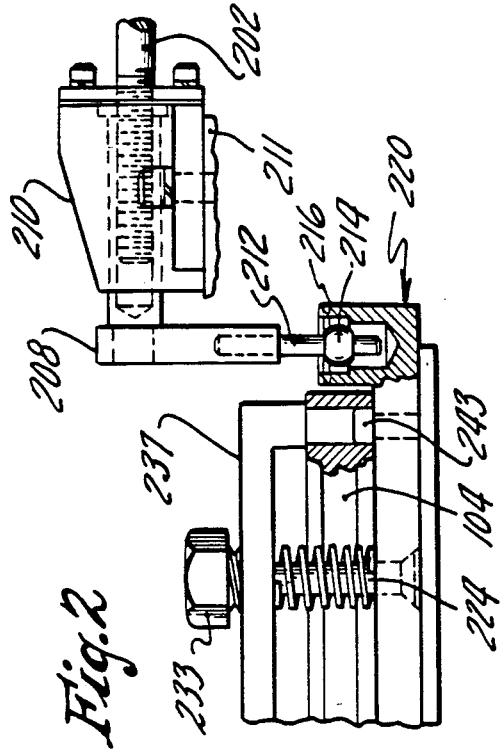
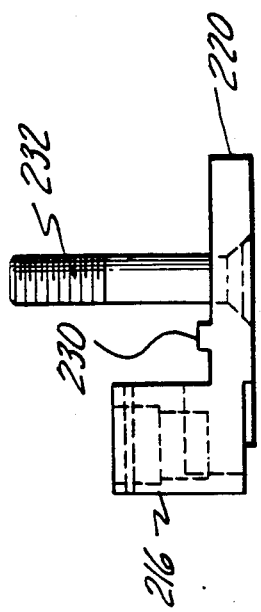
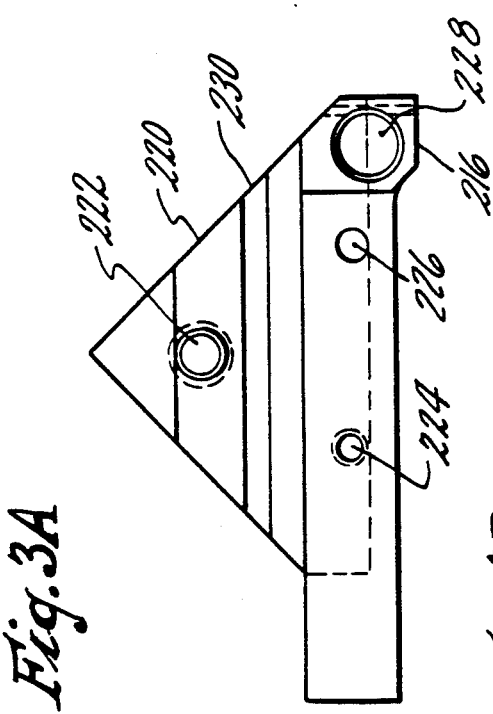
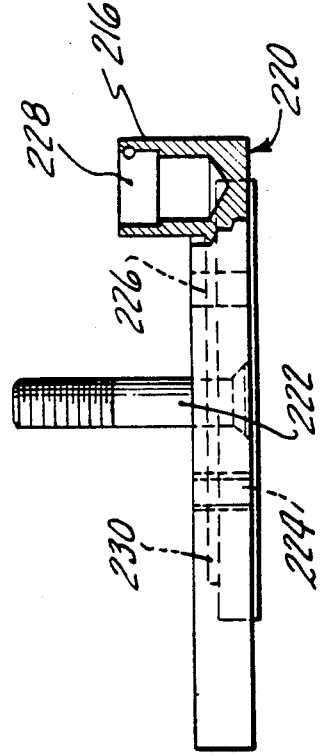

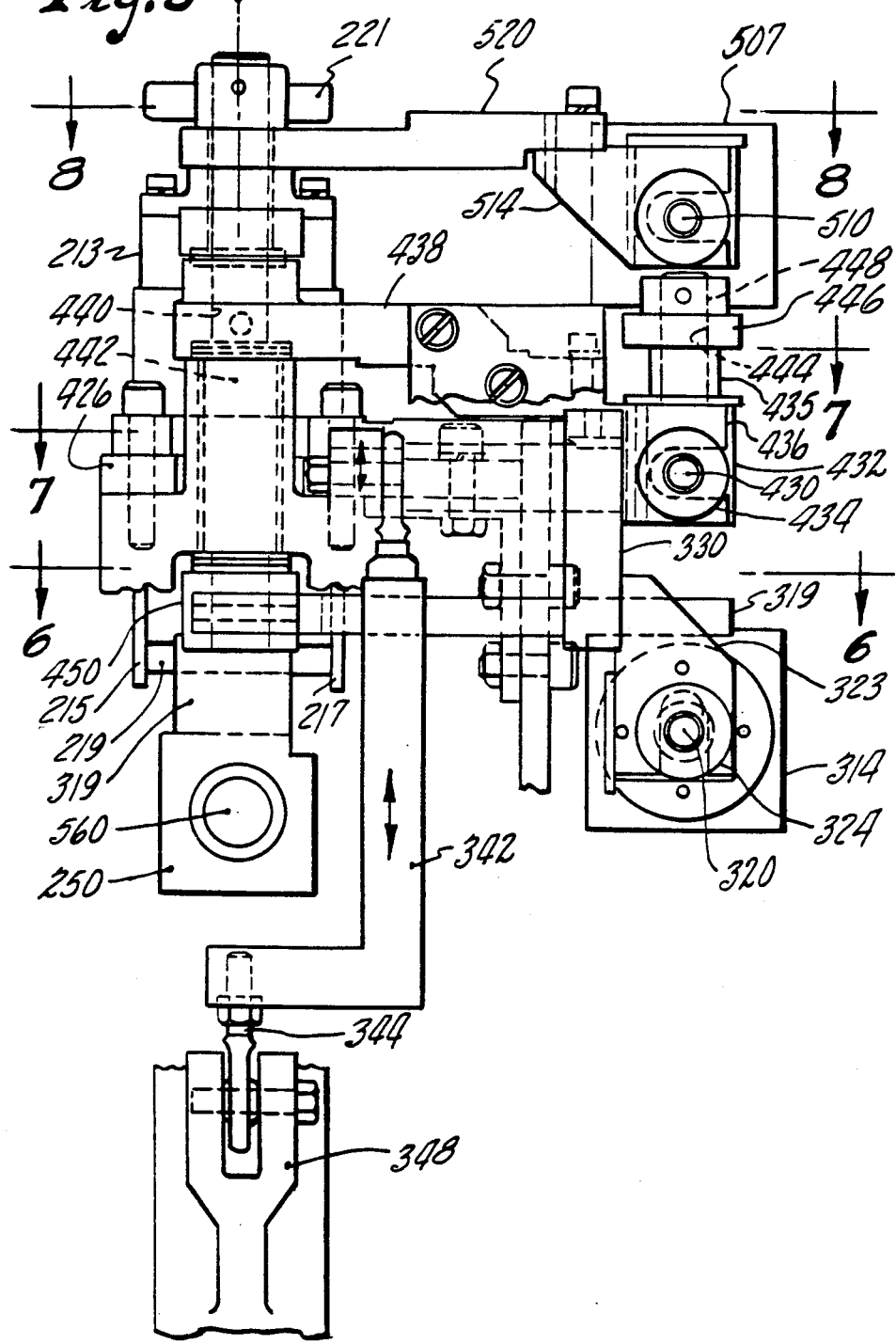

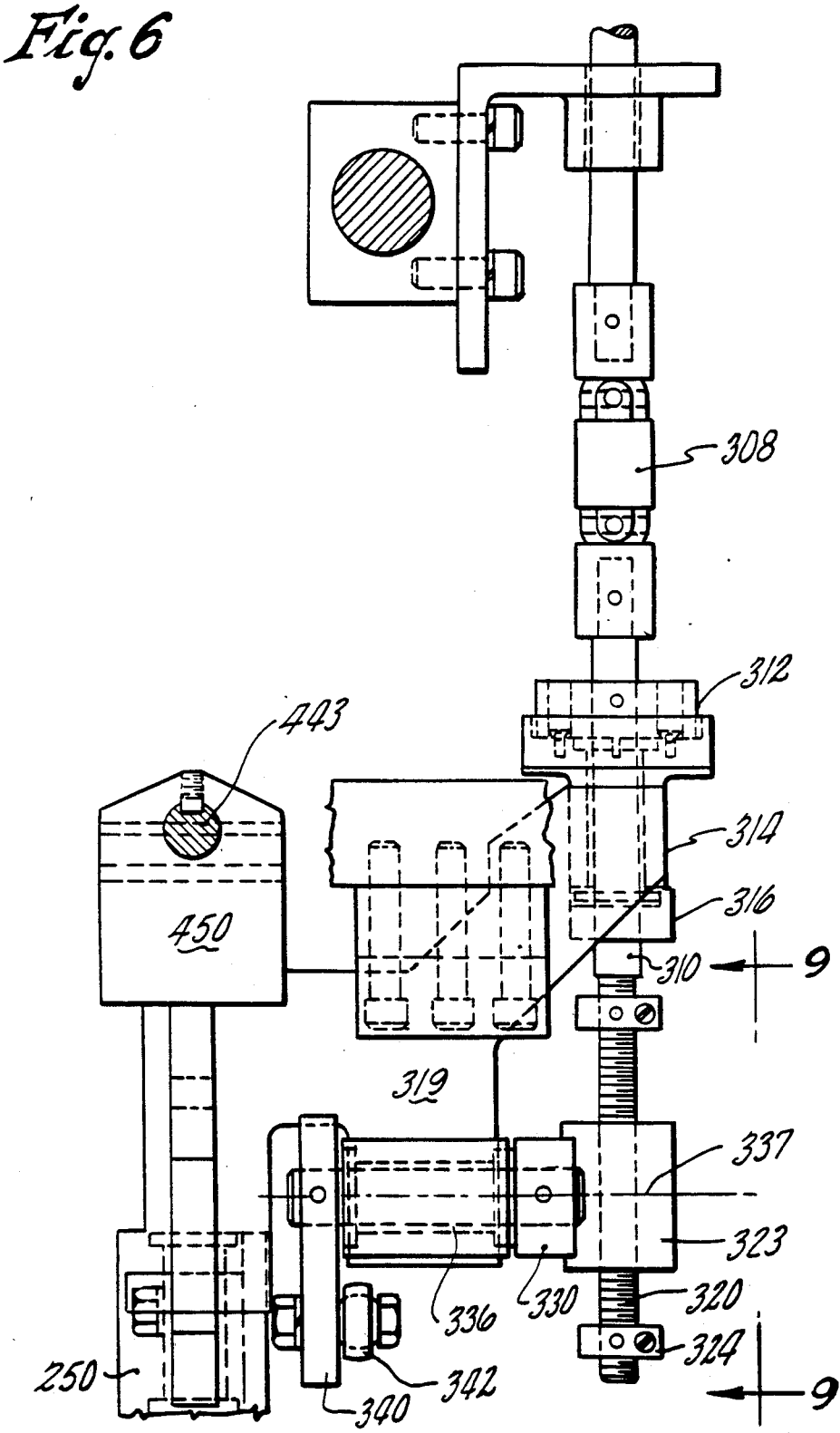

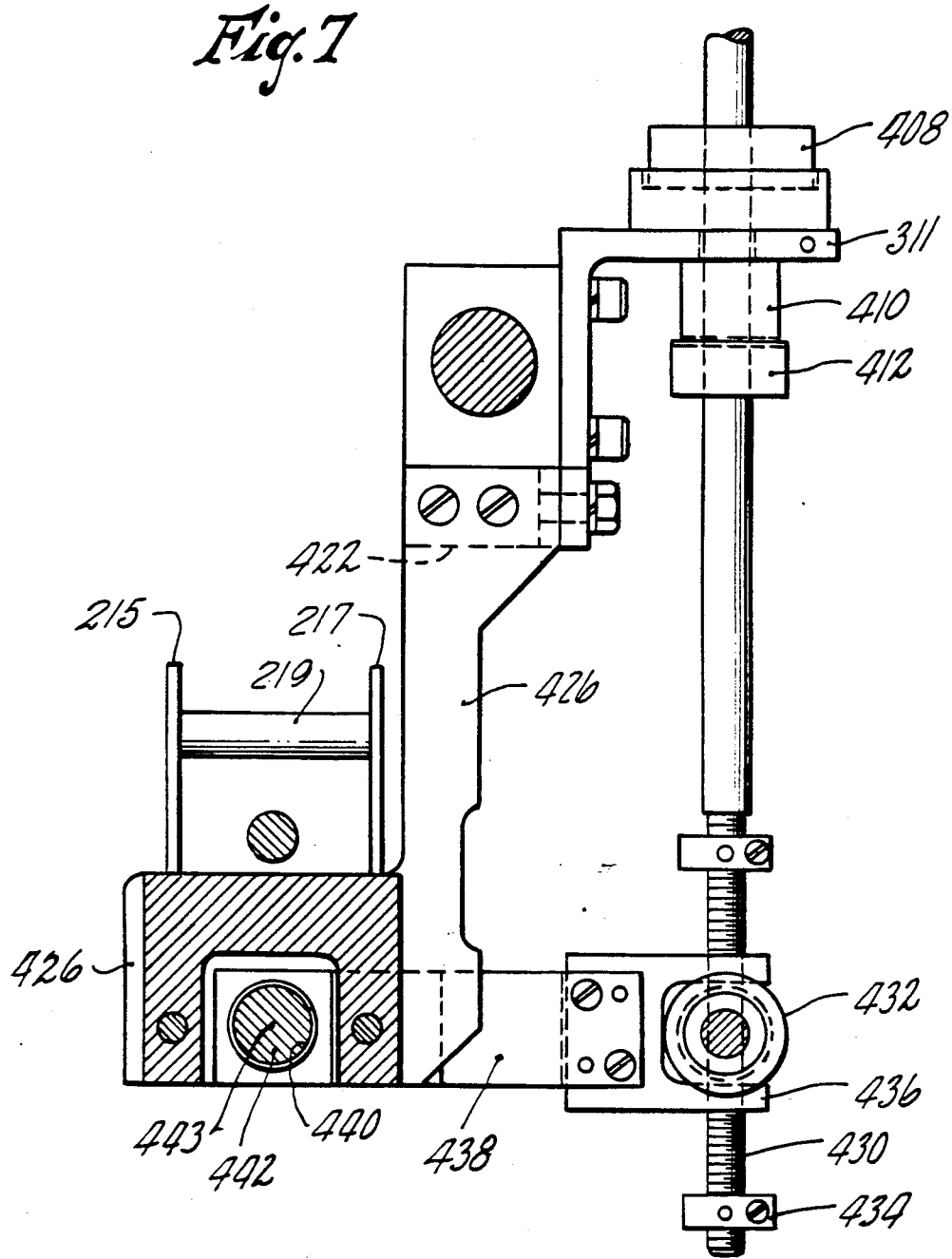

DEFLECTOR ADJUSTMENT FOR A GLASSWARE FORMING MACHINE

This is a continuation of co-pending application Ser. No. 472,391 filed on Mar. 4, 1983, abandoned.

BACKGROUND OF THE INVENTION

1. Field of the Invention

The invention relates generally to glassware forming machines of the rotating table type having a plurality of continuously rotating, circumferentially spaced forming units. More particularly, the invention relates to a deflector adjusting means for adjusting the orientation of the deflector of the delivery means of the machine with respect to the blank molds of each forming unit so the deflector may be properly positioned over its corresponding mold in order to accurately deliver a gob of glass thereto.

2. Description of the Prior Art

Glassware forming machines of the rotating table type are well known in the glassware manufacturing industry. One type of such machine is shown in U.S. Pat. No. 1,979,211 and is commonly referred to as the "Emhart H-28 Machine." This type of machine is a single table, continuous rotary motion machine having a plurality of individual forming units mounted for rotation about the axis of the machine. These machines have been available with different numbers of individual forming units, thus constituting, for example, a 6, 12 or 18 section machine. In such H-28 machines each individual forming unit produces one glassware article for each complete revolution or cycle of the machine and will therefore be referred to herein as H-28 single gob machines.

A significant improvement over the H-28 single gob machine is disclosed in U.S. Pat. No. 4,339,264 which describes an H-28 double gob machine where each individual forming unit produces two glassware articles for each complete cycle. This patent is hereby incorporated by reference in this disclosure in its entirety.

One of the unique features of the prior art H-28 double gob machine is its delivery system, that is, the manner in which it guides or delivers gobs to the continuously rotating blank molds of the machine. Each set of inner or outer blank mold has associated with it a gob guiding unit consisting of a scoop, trough and deflector for guiding gobs into the blank. Each gob guiding unit oscillates over a predetermined arcuate path about a delivery system axis parallel to the machine axis so that in one arcuate direction the speed of the deflector of the gob guiding unit will be close to that of the continuously moving blank to facilitate gob delivery.

Because of the continuous rotation of the blank molds and the oscillating motion of the delivery system, it is important in an H-28 machine, whether single or double gob, that the orientation of the deflector be accurate at the delivery position where it is situated over its respective blank mold. In the H-28 single gob machine the deflector is capable of being adjusted in four axes—-radial, radial tilt, peripheral and peripheral tilt. These adjustments were effected through the use of a relatively complex array of turnbuckles, pivots, etc. The adjustment of the deflector in each of these four directions is possible because there is only a single blank and corresponding deflector at the delivery position thus making the adjustment components relatively accessible.

However, in a prior art H-28 double gob machine the accessibility of adjustment components is necessarily limited by the increased number of mechanical components required to deliver a pair of gobs to a pair of blanks. Consequently, the prior art H-28 double gob machine shown in U.S. Pat. No. 4,339,264 was provided with only a two axis adjustment means--peripheral and radial tilt--instead of the four axis adjustment means available on the H-28 single gob machine. Because of the critical nature of the delivery it was determined that a two axis adjustment for the deflector of the H-28 double gob machine was insufficient and that a four axis adjustment means was necessary. Because of the complexity of mechanical parts in the delivery system for the H-28 double gob machine, the four axis adjustment means used in the H-28 single gob machine was not suitable and a new four axis adjustment means was necessary. Accordingly, it is an object of this invention to overcome the disadvantages of the deflector adjustment means of prior art H-28 double gob machines.

SUMMARY OF THE INVENTION

These and other objects of the invention are achieved by the preferred embodiment which comprises a deflector orientation adjusting means for a deflector oscillating about a first axis comprising a four axis adjustment system for adjusting the orientation of the deflector in four different directions. The invention comprises a first means for adjusting the deflector within its radial plane relative to its respective deflector axis, a second means for adjusting the deflector tiltably about an axis perpendicular to said radial plane, third means for adjusting the deflector along a peripheral arc within a plane substantially perpendicular to its respective deflector axis and a fourth means for adjusting the deflector tiltably about an axis within said radial plane and perpendicular to its respective deflector axis.

BRIEF DESCRIPTION OF THE DRAWINGS

FIG. 1 is a side elevational view of the four axis deflector adustment means, partially in cross section;

FIG. 2 is a view of FIG. 1 along the lines 2—2;

FIGS. 3A, 3B and 3C are various views of a portion of FIG. 1;

FIG. 5 is an end view of FIG. 1 taken along the lines 5—5 partially in cross section with certain portions omitted for clarity;

FIG. 6 is a sectional view of FIG. 5 taken along the lines 6—6;

FIG. 7 is a sectional view of FIG. 5 taken along the lines 7—7;

DESCRIPTION OF THE PREFERRED EMBODIMENT

Figure 4A:
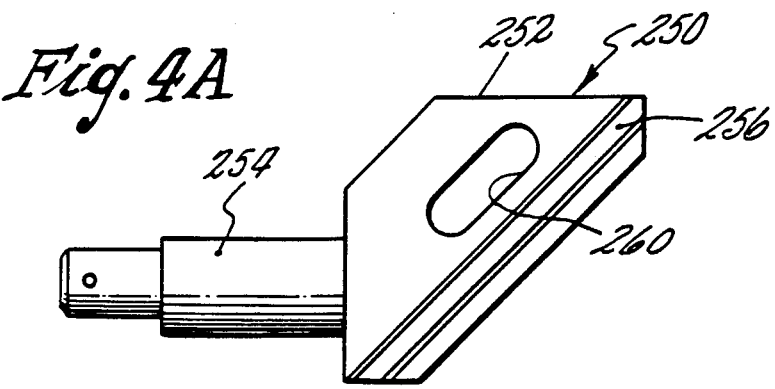
FIGS. 4A and 4B are various views of another portion of FIG. 1.

The invention is a four axis adjustment mechanism 100 shown in FIG. 1 for adjusting the orientation of each deflector of an H-28 double gob machine in four axes--radial, radial tilt, peripheral and peripheral tilt. Each deflector 104 is provided with a separate four axis adjustment mechanism, both being essentially identical except for minor differences necessary to adapt a particular mechanism for either the inner or outer blank mold accordingly.

The four adjustments are essentially made relative to the gob guiding unit axis 110 about which the deflector oscillates, this axis being parallel to the axis of the machine. However, describing the four axes relative to deflector axis 443 will facilitate an understanding of this invention. Each deflector has a generally arcuate shape along the gob path. The gob path lies within a plane which will be defined herein as the radial plane. Generally the radial plane will intersect or substantially intersect deflector axis 443. Movement of the deflector within the radial plane toward or away from axis 443 constitutes a radial adjustment. The radial tilt adjustment tilts the deflector within the radial plane about an axis perpendicular or substantially perpendicular to the radial plane. The peripheral adjustment causes the deflector to generally follow an arcuate path about axis 443, the bottom of the deflector moving along a peripheral arc lying within a horizontal plane perpendicular to axis 443. The peripheral tilt adjustment tilts the deflector about an axis which is both within the radial plane and perpendicular to axis 443.

The invention may best be described by referring to all of the drawings wherein one four axis deflector adjustment mechanism 100 is initially shown in a side elevational view in FIG. 1. For clarity FIG. 1 shows mainly the deflector and trough portions of one gob guiding unit. It will be understood that a similar four axis adjustment mechanism is provided for each gob guiding unit in the machine.

As shown in FIG. 1, gob guiding unit 102 includes a deflector 104, a trough 106 and a scoop (not shown), all mounted to a support frame 108 which arcuately oscillates (by means not shown) about delivery system axis 110. It will be understood that axis 110 is merely diagrammatically located in FIG. 1 to facilitate a description of the invention. An exact location may be determined by one skilled in the art. In one embodiment frame 108 is secured to a pivot shaft (not shown) aligned with axis 110, the frame 108 being pivotable about axis 110 with respect to a main frame which supports the entire delivery system.

The four axis adjustment means 100 is provided with control shafts routed to a common, remote control panel (not shown) where each of the four adjustments radial, radial tilt, peripheral and peripheral tilt may be adjusted by their respective control handles 200, 300, 400 and 500.

Radial adjustments are effected by turning control handle 200 which is connected to stub shaft 202 via a flexible shaft 204 and connector 206. As shown in FIG. 2 shaft 202 is threadably engaged with slide assembly 208 which is slideably engaged within slide keeper 210 which is in turn secured to mounting bracket 211 secured to frame 108. One bracket 211 is secured to each frame 108 and is used to secure trough 106. Trough support adjustment bracket 213 is secured to bracket 211 and has a pair of side plates 215 and 217 (best seen in FIGS. 1, 5 and 7) extending below trough 106. Cross support rod 219 is connected between side plates 215 and 217 to support the bottom of the trough. Adjustment of handle 221 and threaded rod 223 results in vertically adjusting the lower end of the trough.

Slide assembly 208, best seen in FIG. 2, is secured to a shaft 212 having secured near the end thereof a bearing assembly 214 mounted within extension 216 of adjusting bar 220, best seen in FIGS. 3A, 3B and 3C.

Referring again to FIG. 1, it will be noted that translational motion of slide assembly 208 within slide keeper 210 causes the upper end of deflector 104 to move parallel to the axis of shaft 202 thus maintaining alignment with the axis of the upper end of the deflector and trough 106. This alignment is reinforced by other means explained below.

Referring to FIGS. 3A, 3B and 3C, adjusting bar 220 is shown to have threaded aperture 224 and through apertures 222 and 226 as well as extension housing 216. Extension 216 is provided with cylindrical recess 228 for receiving bearing assembly 214 (best seen in FIG. 2). Adjusting bar 220 is provided with a raised rib 230 for slideably mating with a complementary groove in a pivot block to be explained below. A threaded stud 232 is welded within aperture 222 as best seen in FIGS. 3B and 3C.

Referring again to FIGS. 1 and 2, adjusting bar 220 is shown attached to lug 242 of deflector 104 with an opposing clamp bar 237. Pin 243 pivotably fit within aperture 226 serves to align adjusting bar 220 with the deflector. Clamp bar 237 is secured to threaded aperture 224 by clamp bolt 233. Lug 240 is slideably pressed between bars 220 and 237 to assist in maintaining lateral alignment of the deflector. (Note that FIGS. 2 and 3A are drawn to different scales.)

Figure 4B:
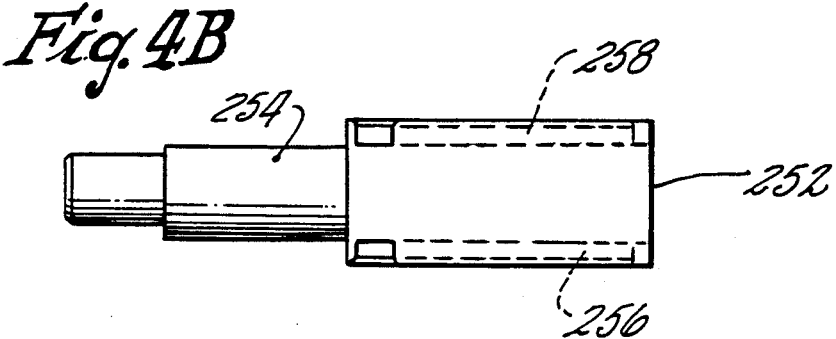

As adjusting bar 220 moves translationally with slide assembly 208 the alignment of the upper end of deflector 104 with the lower end of the trough is maintained by the slideable engagement of rib 230 with a corresponding groove in pivot block 250, best seen in FIGS. 4A and 4B. Pivot block 250 is provided with a block portion 252 and a pivot portion 254. Block portion 252 is provided with parallel grooves 256 and 258 symmetrically on each side of the block. Pivot block 250 is suitable for use with both the inner and outer gob guiding units although only one of the grooves 256 or 258 will be used in each assembly. Pivot block 250 is also provided with a through slot 260.

As shown in FIG. 1, adjusting bar 220 is secured to the far side of pivot block 250 with rib 230 mated with groove 258. Stud 232 is secured within slot 260 by a standard hex nut 235 and spring washers, the nut being torqued to predetermined specifications in order to permit slideable motion between the stud and the slot.

It will thus be seen that as shaft 202 is rotated to cause a translational motion of slide assembly 208, adjusting bar 220 will move relative to frame 108 and parallel to the axis of shaft 202, this alignment being maintained by the cooperative action of rib 230 and groove 258. This results in the upper end of deflector 104 being moved radially relative to parallel axes 110 and 443 (i.e. within the radial plane). Motion of the lower end of deflector 104 is limited because of the radial tilt adjustment components described below.

The radial tilt adjustment is effected by rotating control knob 300 to which are connected, in sequence, shaft 302, double universal joint 308 and adjusting rod 310. Shaft 302, as well as corresponding shafts connected to control handles 400 and 500, may be a two piece structure with a universal joint (not shown) in order to accomodate motion of the adjusting mechanisms (mounted near the deflector) relative to the control panel. Rod 302 passes through bearing 309 secured to mounting block 311 which is secured to frame 108. Rod 310 also passes through fixed bearing block 314 having a detent flange 312 pinned to rod 310 on one side of the block and retaining collar 316 pinned to rod 310 on the other side of the block. Block 314 is secured to plate 319. Rod 310 has a threaded end portion 320 in threaded engagement with a cylindrical adjusting post 322 and terminates in a threaded end collar 324 (best seen in FIGS. 6 and 9).

Adjusting post 322 rides within yoke assembly 323 which is connected to a crank lever 330 the other end of which is pinned to shaft 336. Shaft 336, having axis 337, passes through a bearing block 338 mounted on plate 319 and has pinned to its other end another crank lever 340. The other end of crank lever 340 is connected to one end of rod end mounting block 344 via dog link 342. The other end of mounting block 344 is secured to lug 348 of deflector 104.

Figure 9:
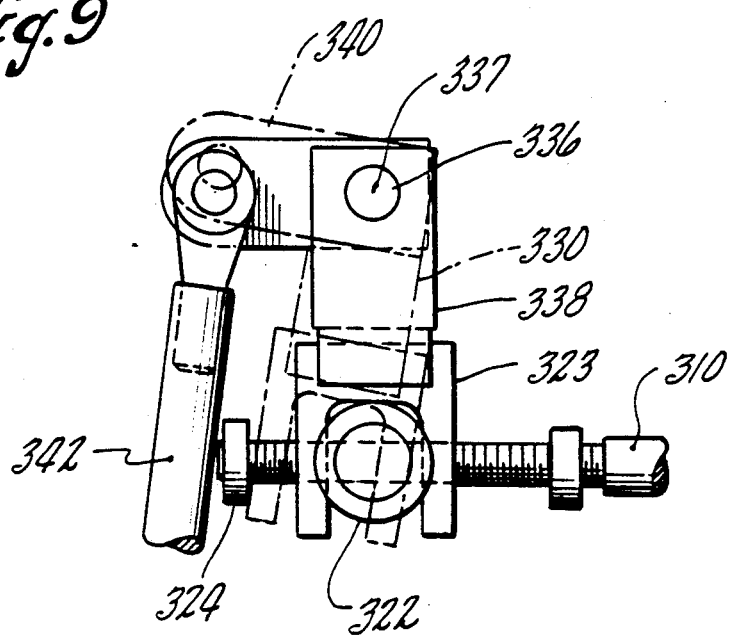
FIG. 9 is a sectional view of FIG. 6 taken along the lines 9—9.

As best seen in FIG. 9, as rod 310 is rotated crank lever 330 will pivot about axis 337 causing crank lever 340 to tilt the lower end of deflector 104 in a radial plane, about the axes of lug 242 and pin 243 (i.e., about an axis perpendicular to the radial plane). This constitutes a radial tilt adjustment and causes a corresponding motion of all components (pivot block, etc.) attached to the deflector. Detent flange 312 will hold this adjustment during machine operation and during motion of the radial tilt adjusting components caused by other adjustments.

It should be noted that the lower end of deflector 104 not only moves radially but also parallel to axis 110. Furthermore, since link 342 is pivotable about axis 337 which does not move relative to support bracket 211 during radial adjustments, large radial adjustments will cause significant radial tilt. Thus, the radial and radial tilt adjustments are dependent upon each other and adjustment of one may require a compensating adjustment of the other.

The peripheral adjustment is effected by control handle 400 to which is connected a shaft 406. Shaft 406 has pinned to it a detent flange 408 which acts in cooperation with bearing block 410, and retaining collar 412. Block 410 is secured to frame 108 via mounting bracket 311 which is in turn connected via angle bracket 422 to stiffening plate 426, best seen in FIG. 7. The threaded end 430 of shaft 406 is threadably engaged with adjusting post 432 and terminates in a pinned threaded collar 434. Adjusting post 432 is mounted within yoke block 436. One end of lever 438 is connected to yoke block 436 while the other end is provided with an aperture 440 for mateable engagement with shaft 442 having axis 443. As seen in FIGS. 1 and 5 adjusting post 432 is connected to a shaft 435 the upper end of which is rotatably retained within aperture 444 of mounting plate 446 by a pinned retaining collar 448. The function of plate 446 will be explained below with reference to FIG. 8. The other end of shaft 442 is fixedly secured to bell crank and bearing support 450 which is welded to bracket 319, the other end of bracket 319 serves to pivotably secure pivot block 250 (best seen in FIGS. 1 and 5).

In operation, as control handle 400 is rotated, shaft end 430 will rotate within adjusting post 432 causing it to move longitudinally along the shaft. Post 432 is free to rotate within yoke 436 and rotation of the shaft 430 causes yoke 436 and lever 438 to pivot about axis 443. This in turn causes pivot block 250 to move in an arc in a plane perpendicular to axis 443 thus adjusting the peripheral alignment of deflector 104.

Figure 8:
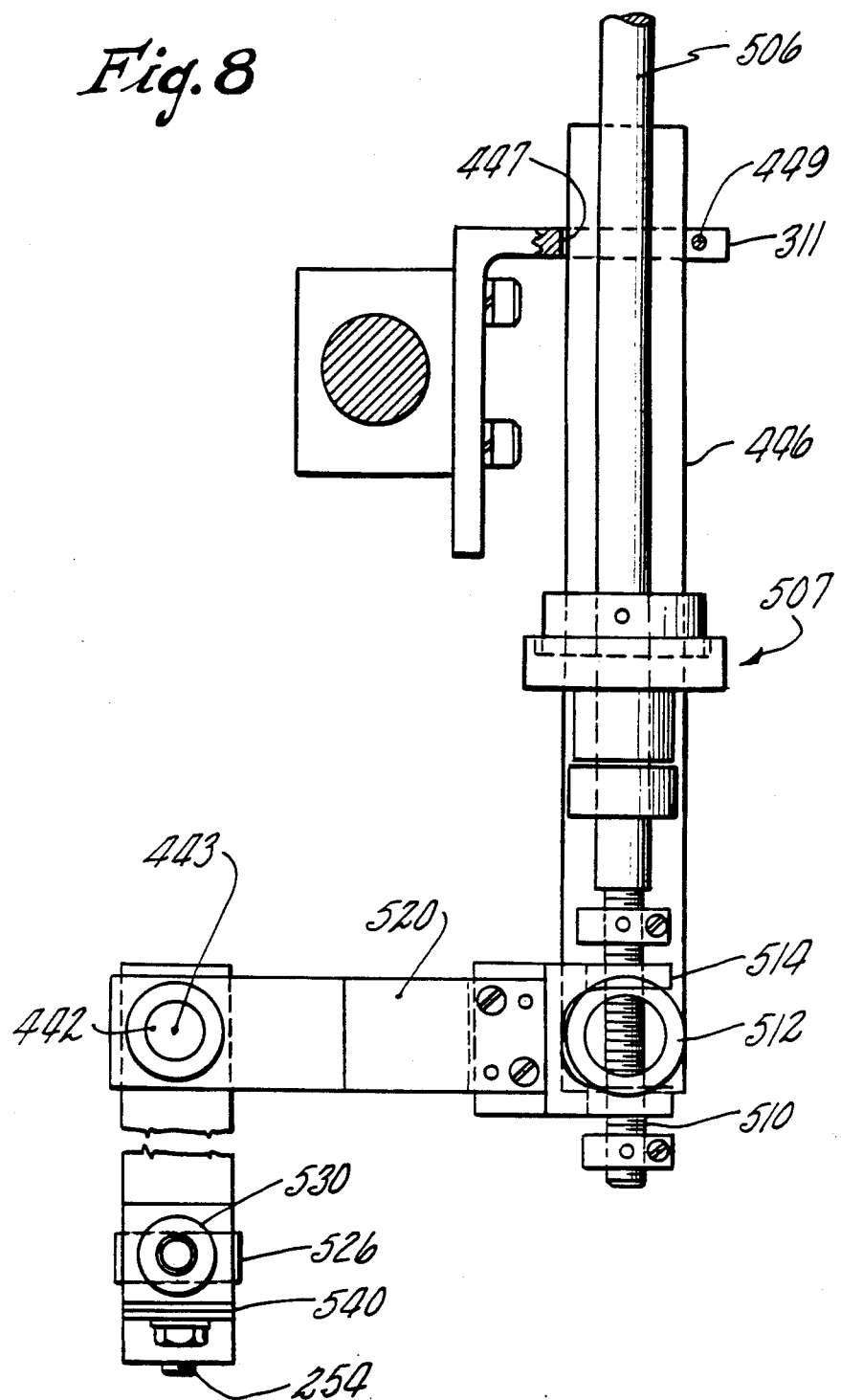
FIG. 8 is a sectional view of FIG. 5 taken along the lines 8—8.

The peripheral tilt adjustment is effected by control knob 500 to which is connected a shaft 506 which passes through a fixed bearing block detent arrangement 507 similar to the other control shafts mentioned above. Referring to FIGS. 1, 5 and 8 it will be noted that detent block 507 is welded to plate 446 which is in turn guided by slot 447 in mounting bracket 311. Pin 449 retains plate 446 within the slot. Shaft 506 is provided with a threaded end 510 which is in threaded engagement with adjusting post 512 which is secured to yoke block 514 and operates in a manner similar to that described above with respect to post 432 and yoke block 436. A bell crank assembly 520 is pivotable about shaft 442 and is secured at one end to yoke block 514 and at the other end to follower yoke 526. Follower yoke 526 is attached to an aperture in the end of bell crank 520 by collar 530. Lever 540 has secured at one end thereof a roller 542 for engagement with follower yoke 526, the other end of lever 540 being pinned to pivot portion 254 of pivot block 250.

It will be noted that rotation of control handle 500 causes translational motion of adjusting post 512 along the axis of shaft 506 which in turn causes rotational motion of bell crank 520 about axis 443. The upper end of lever 540 will therefore be caused to rotate about the axis 560 of pivot block 250 cauisng rotation of pivot block 250 thus peripherally tilting deflector 104 (i.e. about an axis within the radial plane and perpendicular to axis 443).

It will be noted that, unlike the mutually dependent radial and radial tilt adjustments, the peripheral and peripheral tilt adjustments are each independent of each other and the other adjustments. As a peripheral adjustment is made, the peripheral tilt adjustment is unaffected because detent block 507 moves with plate 446. The peripheral adjustment causes plate 446 to slide within slot 447, thus affecting the position of detent block 507 on shaft 506, but not the detented position of the shaft.

It will be understood by those skilled in art that numerous modifications and improvements may be made to the preferred embodiment of the invention disclosed herein without departing from the spirit and scope thereof.

What is claimed is:

1. An improved glassware forming machine of the type having a rotating table including a plurality of forming units spaced about its periphery, each unit having at least two blank molds which, in operation, rotate about a first axis at a first and second radius respectively; at least two gob guiding units each for periodically delivering gobs of molten glass to a corresponding one of said blank molds at predetermined respective position about said first axis, each gob guiding unit including a scoop, a trough, and a deflector extending along a deflector axis; each deflector lying within a radial plane substantially intersecting its respective deflector axis and the first axis, and, in operation, arcuately oscillating around a gob guiding unit axis essentially parallel to said first axis, in which the improvement comprises means for adjusting the orientation of at least one of said deflectors, comprising:

radial adjusting means for translating said deflector within said radial plane along the deflector axis;

radial tilt adjusting means for pivotally adjusting the position of an outfeed end of said deflector around a pivot point near the infeed end thereof, about an axis essentially perpendicular to said radial plane;

peripheral adjusting means for translating an outfeed end of said deflector along an arc within a plane essentially perpendicular to its respective deflector axis; and peripheral tilt adjusting means for rotating said deflector about an axis within said radial plane essentially perpendicular to its respective deflector axis, wherein the deflector is fixed to a pivot block near an infeed end of said deflector, and the radial, peripheral, and peripheral tilt adjusting means comprise mechanisms remotely operable from the top guiding units for adjusting the position and orientation of the pivot block.

2. In a glassware forming machine of the type including a plurality of blank molds, and for each blank mold a glass gob delivery system incorporating a chute, a trough, and a deflector extending along a deflector axis for guiding glass gobs to said blank mold, and further including means for oscillating said deflector about a first axis along a predetermined arcuate path, the improvement comprising:

a pivot block fixed to said deflector near an infeed end thereof;

radial adjusting means for translating the pivot block and thereby translating said deflector within a radial plane substantially intersecting said deflector axis and said first axis;

radial tilt adjusting means for pivotally adjusting the position of an outfeed end of said deflector around a pivot point near the infeed end thereof, within the radial plane;

peripheral adjusting means for translating said pivot block along an arc in a plane essentially perpendicular to the deflector axis; and peripheral tilt adjusting means for rotating said pivot block around an axis essentially perpendicular to its deflector axis and the radial, peripheral, and peripheral tilt adjusting means comprise mechanisms remotely operable from the glass gob delivery system for adjusting the position and orientation of the pivot block.

* * * * *